Sept. 1, 1970   A. S. BUSER ET AL   3,526,131
TIRE MARKING APPARATUS
Filed Sept. 9, 1968   5 Sheets-Sheet 1
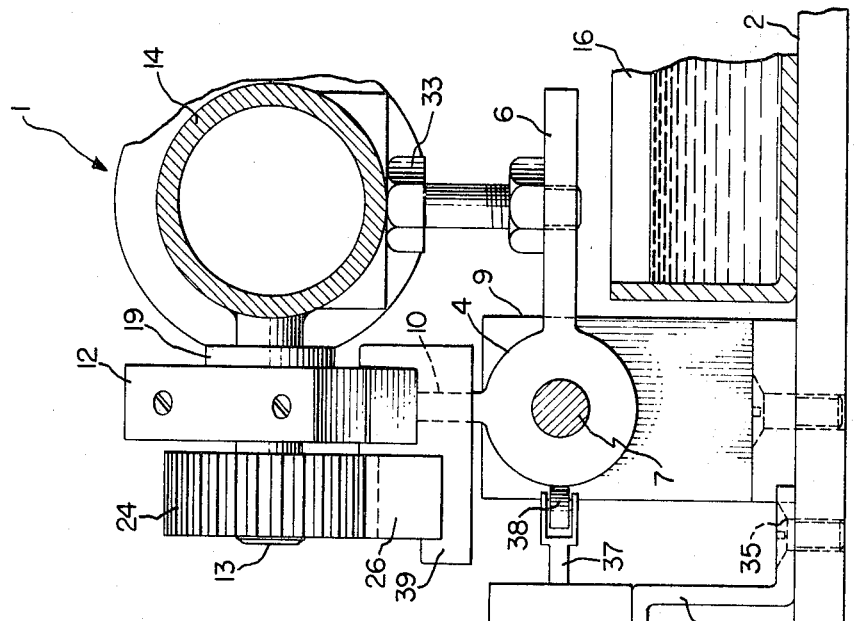
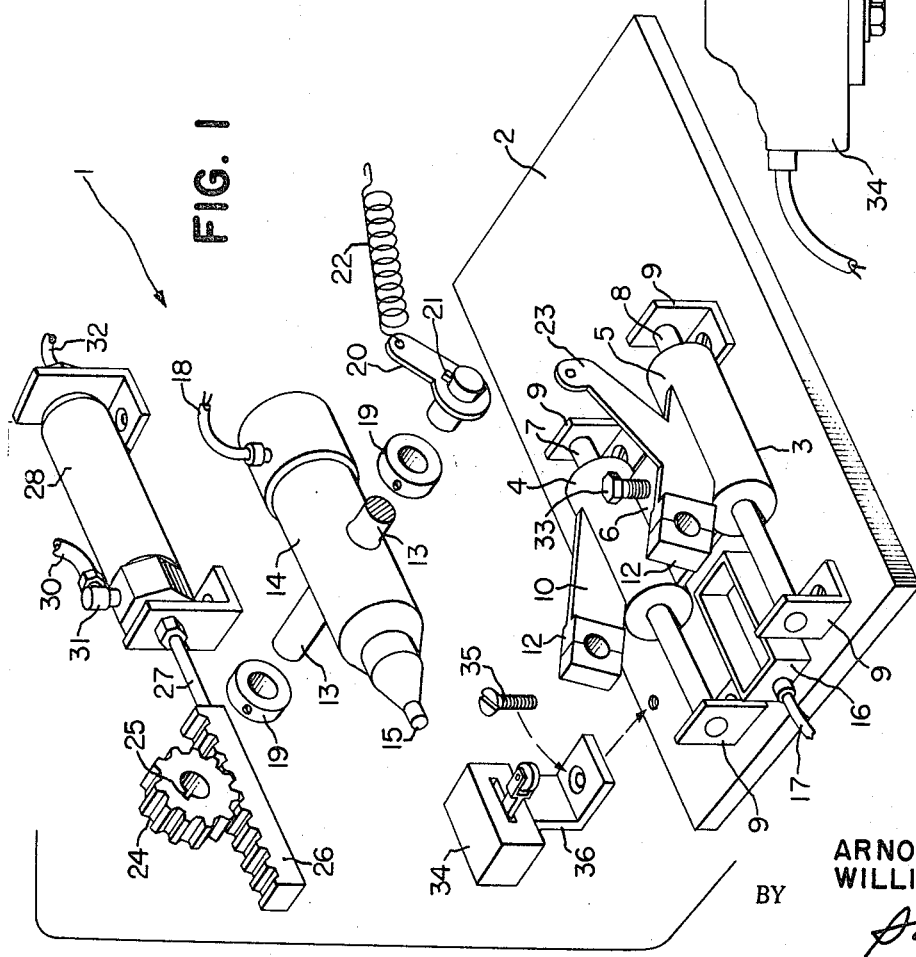
INVENTORS
ARNOLD S. BUSER
WILLIAM D. BRADEN
BY
*A. Milliken*
ATTORNEY

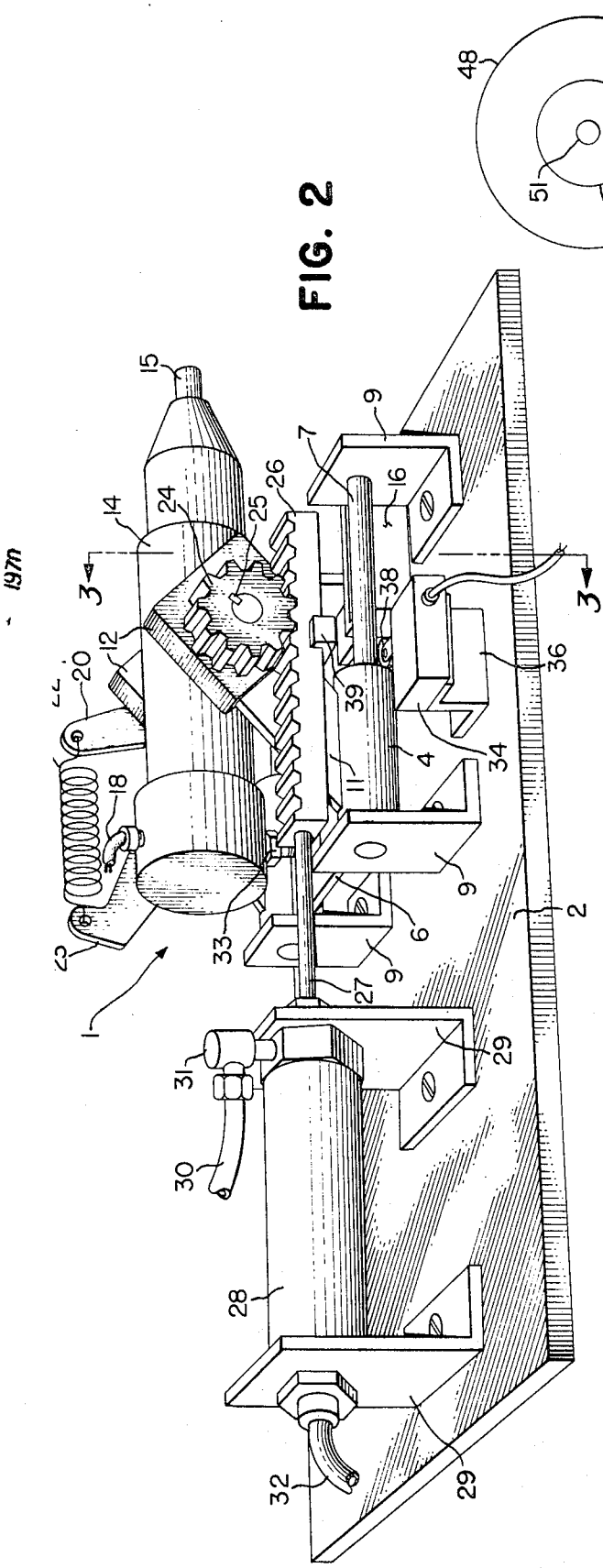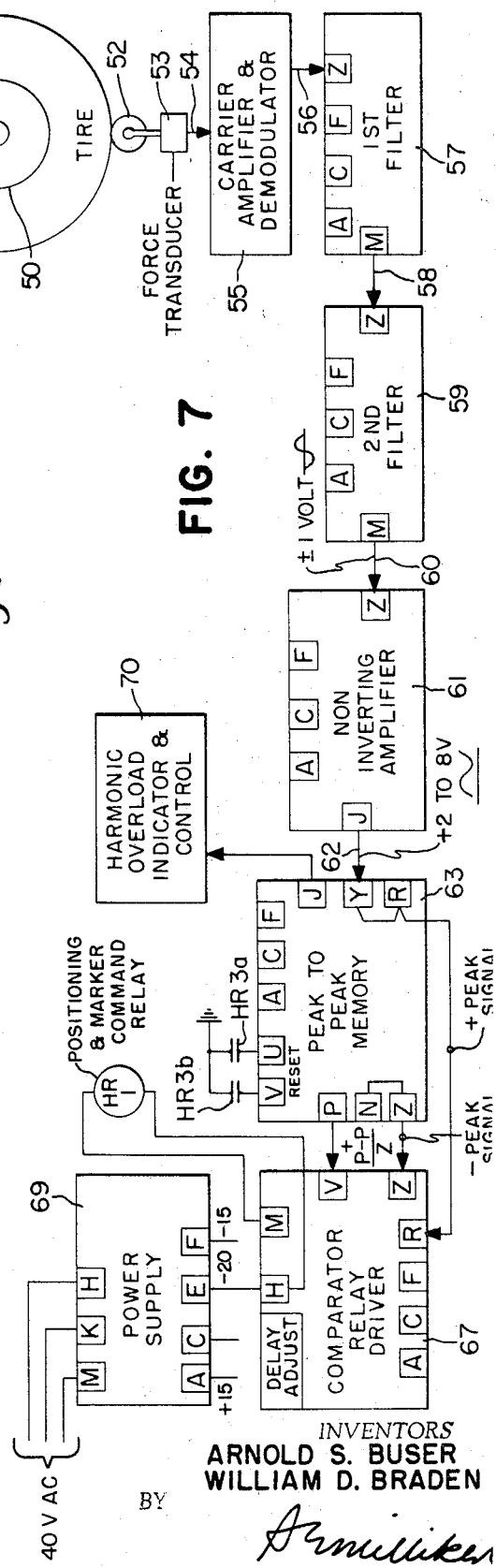

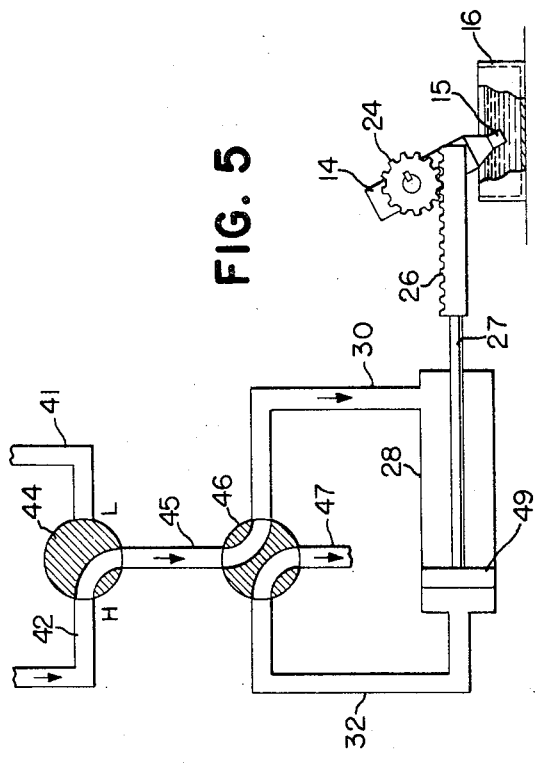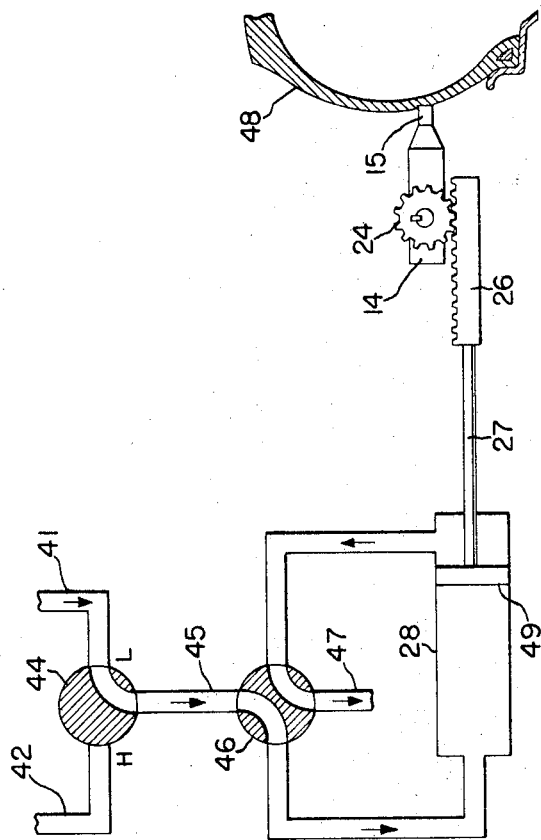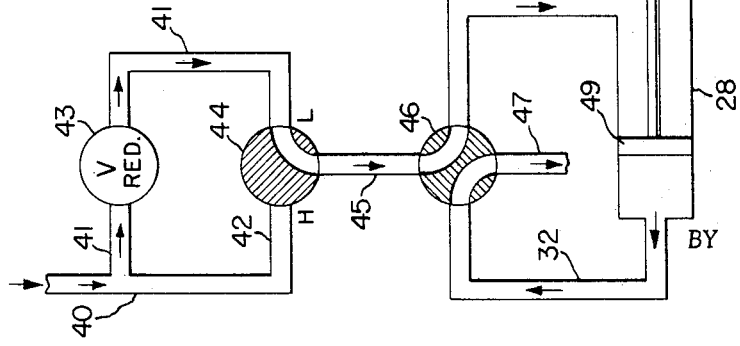

INVENTORS
ARNOLD S. BUSER
WILLIAM D. BRADEN

ATTORNEY

United States Patent Office 3,526,131
Patented Sept. 1, 1970

3,526,131
TIRE MARKING APPARATUS
Arnold S. Buser, Akron, and William D. Braden, Stow, Ohio, assignors to The Goodyear Tire & Rubber Company, Akron, Ohio, a corporation of Ohio
Filed Sept. 9, 1968, Ser. No. 758,438
Int. Cl. B60c *19/00*
U.S. Cl. 73—146                                    11 Claims

ABSTRACT OF THE DISCLOSURE

An apparatus for marking the location on a tire of the first harmonic. The apparatus has a heated branding iron which is automatically dipped in wax and pressed against a tire at the location to be marked. The branding iron is moved to and from the tire by a pneumatic actuator cylinder which, in turn, is controlled by an electronic control circuit which operates in response to force variation readings taken around the circumference of a tire by a conventional force variation measurement machine. The heated branding iron makes a permanent indentation on the tire and simultaneously deposits a wax ring around the indentation to make it more readily visible.

---

This invention relates to an apparatus for marking a tire to indicate the location of the first harmonic of the tire.

BACKGROUND OF THE INVENTION

It is well known in the prior art to take force variation measurements around the circumference of a tire to determine whether or not the tire is of sufficient uniformity that it will meet certain quality control standards and will provide the desired ride characteristics which make it acceptable for sale to the public. In a typical force variation measurement machine, the tire is mounted on a rim and placed upon a rotatable spindle. The tire is then rotated and a roller carried by a force transducer is brought into contact with the periphery of a tire. As the tire rotates, the roller riding against the tire reacts to variations in the force of the tire and transmits this reaction to the tire force variation to the force transducer which converts the force variations into electrical signals which are amplified and modulated and then passed on through various circuitry to either visual gauges or indicators or to recording graphs where the force variation information is permanently recorded. When force variation readings are taken on a conventional force variation machine and the results are recorded on a graph, the result is a sine wave which has a high and low point and a number of minor variations along the wave which produce the image of a rather irregular or zigzag line.

The present invention is designed for use as an attachment to a conventional force variation machine. It utilizes the signal from the force transducer and filters out all the minor force variations along the sine wave and leaves only an indication of the highest force reading taken from the tire. This highest force reading indicates the location of the first harmonic of the tire. Once this location is established for any given tire, rotation of the tire is stopped with the tire positioned so that the location of the first harmonic is adjacent to a branding iron which moves in and imparts a brand to the tire at the location of the first harmonic. The tire is then mounted on the wheel rim in a circumferential position which is determined by balancing the location of the first harmonic of the tire with the radial run out of the rim in order to achieve smoother ride characteristics.

OBJECTS OF THE INVENTION

The primary object of this invention is to provide an apparatus for locating and marking the location of the first harmonic of a tire so that it may be balanced with the radial run out of the wheel rim on which the tire is mounted.

Another object of this invention is to provide an apparatus which may be used in conjunction with a conventional force variation machine and may obtain its input signals from the circuitry of the force variation machine.

Still another object of the invention is to provide a tire marking apparatus which operates rapidly and automatically.

These and other objects of the invention will become more fully apparent as the description proceeds in the following specification and the appended drawings.

BRIEF DESCRIPTION OF THE DRAWINGS

FIG. 1 is an exploded perspective view of the brander of the invention;

FIG. 2 is an assembled perspective view of the brander shown in FIG. 1 but looking at the opposite side from that shown in FIG. 1;

FIG. 3 is a fragmentary cross-sectional view taken on line 3—3 of FIG. 2;

FIG. 4 is a diagrammatic view showing the pneumatic system which operates the brander with the brander in a retracted position;

FIG. 5 shows a view similar to FIG. 4 but with the brander being dipped in melted wax;

FIG. 6 is a view similar to FIG. 4 but with the brander extended in a marking position against the sidewall of a tire;

FIG. 7 is a block diagram showing the overall circuitry which controls the operation of the brander;

DESCRIPTION OF THE PREFERRED EMBODIMENTS

Figure 10:
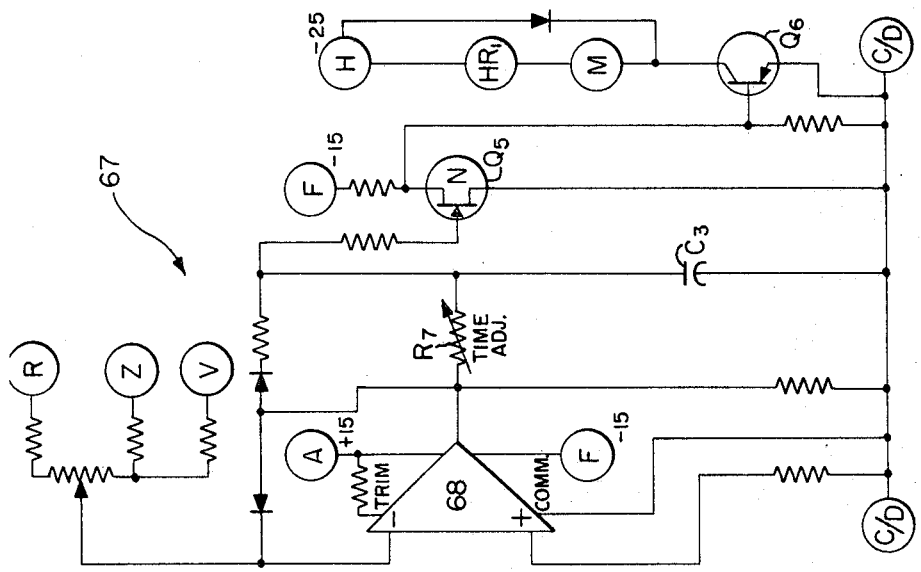
FIG. 10 is a detailed circuit diagram of the comparator/driver.

Referring now to the drawings and in particular, to FIGS. 1 through 3, the entire brander assembly is indicated by the numeral 1. The brander 1 has a base plate 2 upon which the various components of the brander are mounted. When the brander 1 is mounted on a force variation machine, the plate 2 is provided with an adjustable bracket, not shown, for attaching the brander to a force variation machine adjacent to the sidewall of the tire mounted on the machine. Normally, the brander assembly is adjustable with respect to the tire so that the brand will be placed at a certain desired radial location on the sidewall of the tire. It will be understood, of course, that when a different size tire is placed on the force variation machine, the position of the brander must be changed to correspond to the particular tire being marked by the brander.

The various parts of the brander 1 may be best seen by referring to FIGS. 1 and 2. A slide member 3 having a pair of cylindrical sleeves 4 and 5 joined together by a horizontal web 6 is mounted to slide on parallel horizontal rods 7 and 8. Both the rods 7 and 8 are supported on each end by L shaped brackets 9 bolted to the base plate 2, with the rods 7 and 8 mounted parallel to the plate 2 and parallel to each other and with the sleeves 4 and 5 slidably mounted on rods 7 and 8 respectively. The slide member 3 is movable horizontally back and forth between the brackets 9 supporting the ends of rods 7 and 8. Extending upwardly from the top of sleeves 4 and 5, are support arms 10 and 11, each of which carries a bearing 12 on the upper end thereof. Each of the bearings 12 receives a shaft 13 extending laterally from opposite sides of the branding iron 14. The shaft 13 is rigidly attached to the branding iron 14 so that rotation of the shaft 13 in the bearings 12 will tilt the branding iron downwardly so that the tip 15 will dip into a wax container 16. The container 16 has an electrical heating element therein (not shown) to melt wax in the container. Electrical power to the heating element is supplied through the line 17. Power to the branding iron 14 is supplied through the line 18. The shaft 13 carries bushings 19 fastened thereto on each side of the branding iron 14 to prevent the shaft 13 from moving axially in the bearings 12. The bushings 19, as shown herein, are mounted inwardly on the shaft from the bearings 12. On one end of the shaft 13 outside the bearing 12, a lever arm 20 is keyed to the shaft 13 by a key 21 so that the arm 20 will rotate with the shaft 13. Connected to the outer end of the arm 20 is a spring 22 which has its opposite end connected to a fixed arm 23 extending rearwardly from the support arm 11. On the opposite end of the shaft 13 from the arm 20 is mounted a gear 24 keyed to the shaft 13 by a key 25. The gear meshes with a horizontal rack 26 carried by a rod 27 of a pneumatic actuator 28. The actuator 28 is supported by brackets 29 bolted to the base plate 2. The actuator 28 has an air line 30 connected to a fitting 31 on the rod end of the actuator. An air line 32 is connected to the other end of the actuator 28.

Referring now to FIG. 2, it may be seen that the spring 22 connected between the lever arm 20 and the fixed arm 23 tends to pull lever arm 20 rearwardly toward the arm 23. Since the arm 20 is keyed to the shaft 13, such tension on the arm 20 tends to hold the branding iron 14 in a horizontal position with the rear of the branding iron resting against a stop bolt 33 which is screwed into the web 6 of the slide 3. By rotating the bolt 33, the height of the bolt head may be adjusted and this, in turn, will adjust the relative position of the branding iron 14. In other words, the tension of spring 22 urges the rear portion of the branding iron 14 against the head of stop bolt 33. The branding iron 14 remains in this horizontal position resting on the stop bolt 33 except when it is tilted forward to immerse the tip 15 in the wax container 16.

The sequence of steps in the operation of the brander assembly 1 will be described in further detail later in the specification. A limit switch 34 is bolted to the base plate 2 by a bolt 35 passing through a bracket 36. The limit switch 34 is mounted adjacent the sleeve 4 of the slide 3 and carries a follower arm 37 with a roller 38 thereon. When the slide 3 is in the retracted position, the contacts of the limit switch 34 are closed completing the circuit. When the slide 3 moves forward with the branding iron in the extended position, the sleeve 4 contacts the roller 38 and moves the follower arm 37 to open the contact of the switch 34 and break the circuit to the motor (not shown) which rotates the tire on the force variation machine to prevent rotation of the tire when the branding iron 14 is in the extended position.

Referring now to FIGS. 2 and 3, it should be noted that the rack 26 is held against the gear 24 by a support bracket 39 which is fastened to the support arm 10 and extends beneath the rack 26. The bracket 39 permits the rack to be moved horizontally back and forth by the rod 27 of the actuator 28.

Referring now to FIGS. 2 and 4 through 6, the steps in the operation of branding a tire with this apparatus and the manner in which the pneumatic actuator positions the branding apparatus will now be described. FIGS. 2 and 4 show the brander in a retracted or normal position. In this position, high pressure air of approximately 100 pounds is received from an air source (not shown) through a high pressure line 40. The line 40 divides into two lines 41 and 42 supplying high pressure air. The line 41 passes through a pressure reducing regulator 43. The line 42 supplies high pressure air to an inlet port of a three-way valve 44. After passing through the reducing valve 43, line 41 then supplies low pressure air to another inlet port of the valve 44. It may be seen that the valve 44 can be switched to two different positions, one of which directs high pressure air from the line 42 through an output port of the valve 44 to a line 45 leading to a four-way valve 46. As shown in FIG. 4, however, the valve 44 is in a position to connect the low pressure line 41 to the line 45 thereby supplying low pressure air to an input port of the valve 46. The valve 46 may be switched into two different positions, one of which directs the flow of air from line 45 through the line 30 attached to the rod end of the actuator 28. In the other position, as shown in FIG. 6, the valve 46 directs the flow of air from line 45 through the line 32 to the free end of the actuator 28. It may be seen that depending upon which end of the actuator 28 is receiving air pressure the air pressure in the opposite end of the actuator is being exhausted through the valve 46 to an exhaust line 47. With the valves 44 and 47 in the position shown in FIG. 4, the brander 1 is in the retracted position as also shown in FIG. 2 with the tip 15 of the branding iron 14 withdrawn but positioned adjacent the sidewall of a tire 48 to be branded. In this position, the piston 49 of the actuator 28 is moved part way to the left of the actuator and is held in this position by low pressure air flowing through the line 30 into the rod end of the actuator 28. In this position, the sleeves 4 and 5 of the slide 3 are pulled back against the brackets 9 and can travel no further in a rearward direction along the rods 7 and 8. So long as only low pressure is maintained in the rod end of the actuator 28, the tension of the spring 22 is sufficient to hold the branding iron 14 in a horizontal position resting on the bolt 33.

In FIG. 5, the position of the valve 44 is changed to bring in high pressure air from the line 42, through the line 45 and through the valve 46 to the rod end of the actuator 28. This additional higher pressure bearing against the piston 49 overcomes the tension of the spring 22 and by pulling rearwardly on the rack 26, rotates the gear 24 and the shaft 13 to tilt the branding iron 14 downwardly to immerse the tip 15 in the melted wax in the container 16. As soon as the tip 15 has been dipped in the wax, the valve 46 changes position to direct the flow of high pressure air through the line 33 leading to the free end of the actuator 28 thereby forcing the piston to the left and moving the rack 26 and the branding iron 14 to the extended position where the heated tip 15 of the branding iron will produce an indentation in the wall of the tire 48 and leave a wax ring around the indentation to make it more easy to locate. The brander remains in the extended position only long enough to mark the tire and then returns to the retracted position, as shown in FIGS. 2 and 4. Up to now, the description has covered the operation of the mechanical portion of the brander and the manner in which the air pressure is valved to operate the actuator. It will be understood that in order to accomplish the control of the mechanical apparatus and to obtain the proper timing sequence of operations performed by the brander, an electrical control system which is coordinated with the relative rotational position of the tire and the force variation readings taken around the circumference of the tire is necessary.

Referring now to FIG. 7, the general arrangement of the control circuitry for this apparatus and how it is connected to a conventional force variation machine will be described. The tire 48 is shown mounted on a rim 50 rotationally carried on a spindle 51. A means (not shown) is provided for rotating the tire on the spindle. A load roller 52 is positioned to bear against the periphery of the tire 48 and is carried by a force transducer 53 which senses the force variation around the circumference of the tire 48 as it is rotated against the roller 52. The force transducer 53 emits a signal through line 54 to a carrier amplifier and a modulator 55 which amplifies and demodulates the signal from the force transducer 53 and transmits this signal through line 56 to a first filter 57, and through a line 58 to a second filter 59. The filters 57 and 59 operate in cooperation with each other to perform a degree of filtering action on the signals passing therethrough that could not be achieved by a single filter of this type. The filters 57 and 59 are conventional amplifier circuits and will not be described in detail since they are not part of the invention. The output of the second filter 59 passes through a line 60 giving off a plus or minus one volt signal which goes to the input of a noninverting amplifier 61 which amplifies and changes the signal to a plus two to eight volts which appears as an output of the amplifier 61 and passes through line 62 to the input of a peak-to-peak memory circuit 63.

Figure 8:
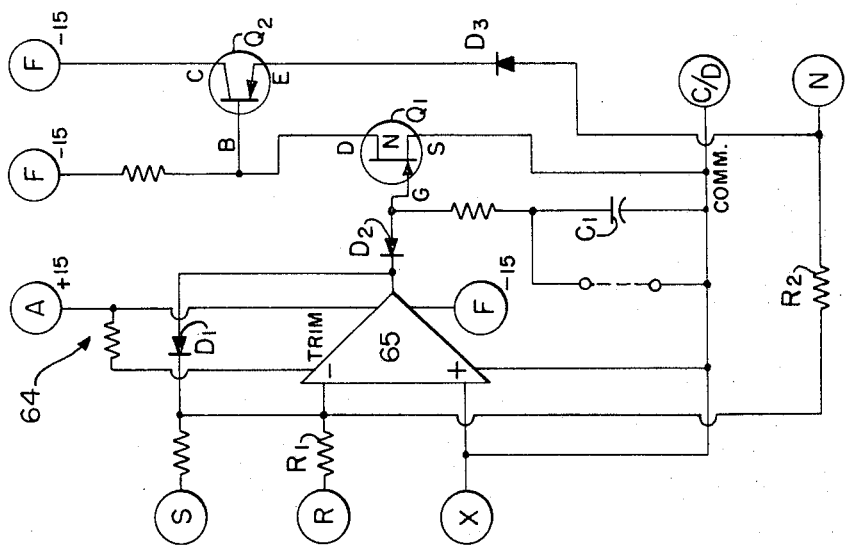
FIG. 8 is a more detailed circuit diagram of the positive peak memory.

The peak-to-peak memory 63 is comprised of two memory amplifier circuits, one for a positive change and one for a negative going signal. The positive peak memory is shown in FIG. 8 and indicated generally by the numeral 64. A positive input signal is applied to point R and inverted by the operational amplifier 65. Transfer of the negative signal through the diode D2, charges capacitor C1. The charged capacitor C1 pinches off the field effect transistor Q1. This raises the base input of the transistor Q2 to a level to induce collector-emitter conduction. The diode D3 conducts through a resistor R2, back to the summing input of the operational amplifier 65. The positive current through resistor R1 is then balanced by the negative current through R2. Unless the signal is raised to a higher positive level the input will remain balanced. The output at N is equal in level and of opposite polarity to the maximum positive input. Discharge of capacitor C1, by closure of point V to C/D resets the memory. Diode D1 conducts if the input signal ever goes negative and holds the output of the operational amplifier 65 near zero.

Figure 9:
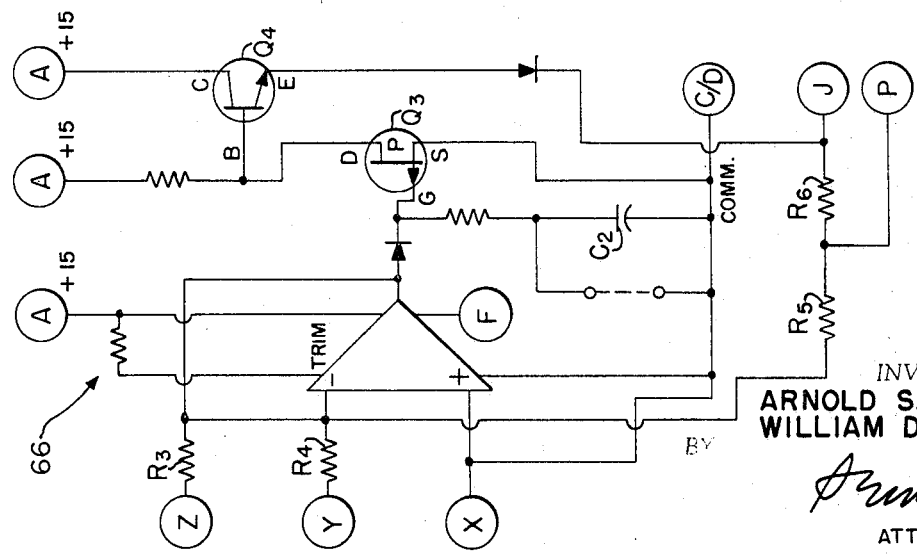
FIG. 9 is a detailed circuit diagram of the negative peak memory.

The operation of the negative peak memory shown in FIG. 9 and indicated generally by the numeral 66 is identical to that of the positive peak amplifier 64 except that it only responds to a negative input and has two positive outputs J and P. The output at J is equal in level to the input and positive in polarity. The output at P is one half the level at J.

Referencing the input Z to the output N of the positive peak memory 63 applies a bias to the negative peak input equal to the maximum positive signal. As the signal level reduces, the difference between the currents through resistor, R3 and R4 applies input. The level of output J represents a peak to peak change of the input signal. The output at P represents one half the peak to peak change.

A comparator relay driver 67 with time adjust is shown in detail in FIG. 10. In the operation of the comparator driver 67, reference currents are applied to the inputs Z and V, resulting in an input bias half way through the input signal change. When an input signal is applied to point R, the output of the operational amplifier 68 will saturate when the signal is above the bias point. The negative output charges capacitor C3, through resistor R7 which serves as a time adjust.

Pinch off of the field effect transistor Q5 occurs near the end of the negative square wave peak. This triggers transistor Q6 to pick up relay HR1. The time adjust delays HR1 relay pick up until the high force point of the tire mounted on the force variation machine has moved adjacent the branding iron 14 in the correct position for marking.

A power supply 69 as shown in FIG. 7 provides the various voltages required for operating the previously described components of the control circuit for the brander 1. Terminals A, C and F on the power supply 69 are connected to comparable terminals also marked A, C and F in the various other components of the control circuit.

Figure 11:
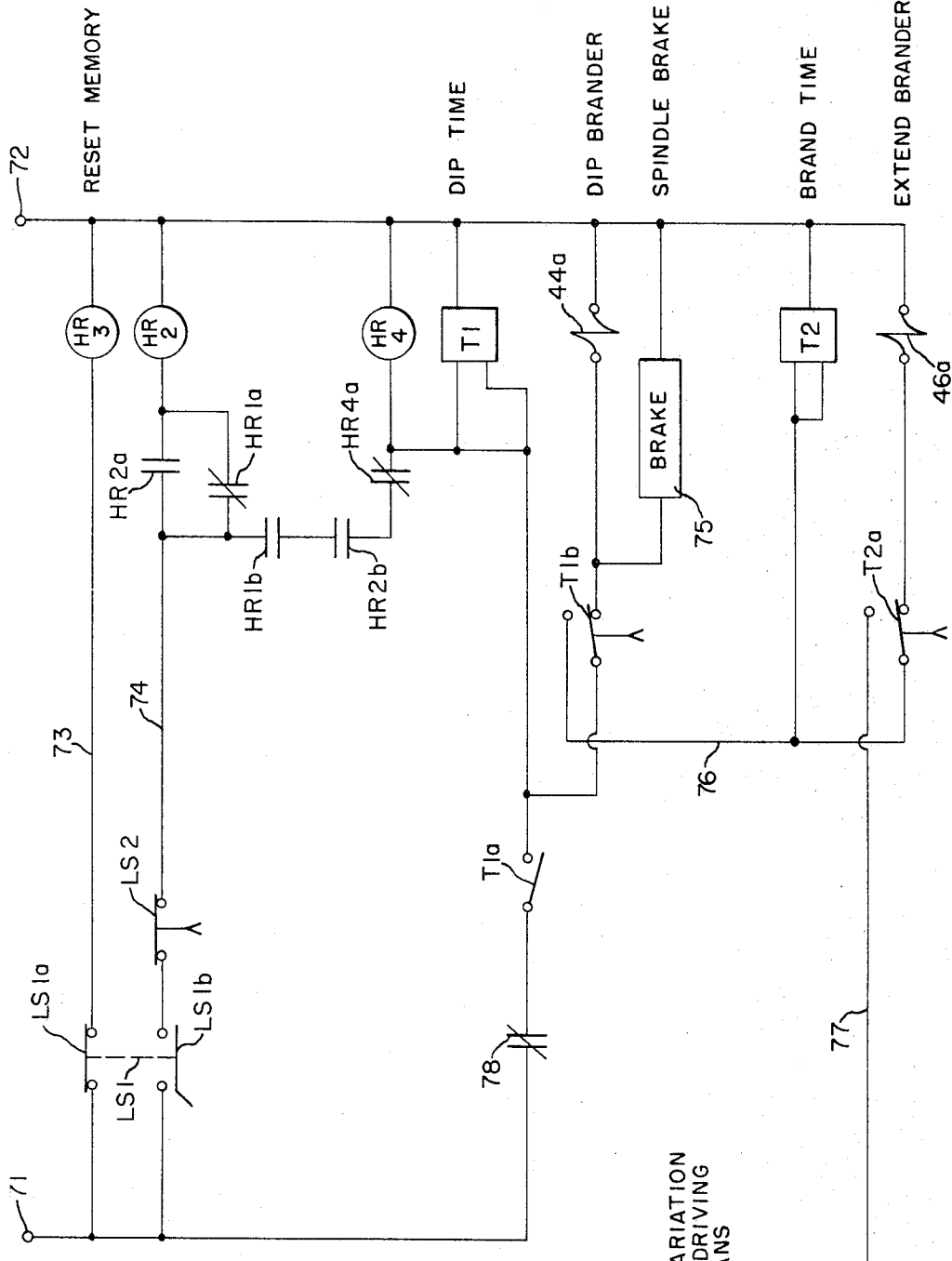
FIG. 11 is a circuit diagram showing the relays which operate the control valves of the pneumatic system shown in FIGS. 4 through 6 which regulates the actuator of the brander.

To provide a better understanding of the overall operation of the brander 1 in conjunction with the force variation machine on which is is used, FIG. 11 shows a relay circuit which coordinates the operation of the force variations machine with the control circuitry shown in FIG. 7 and with the brander 1 shown in FIG. 1. In FIG. 11 the terminals 71 and 72 are connected to a power source which may be the power supply 69 or some other suitable power supply. The terminal 71 indicates the power line and the terminal 72 indicates the ground line. A limit switch LS1 has contacts LS1A and LS1B which make or break circuits through lines 73 and 74 respectively. A limit switch LS2 has a contact connected into line 74 in series with the contact LS1B. Both the limit switches LS1 and LS2 are operated by the spindle 51 shown in FIG. 7 on which the tire 48 is mounted. During the usual marking cycle af a tire on the force variation machine, the limit switch LS1 is tied into the spindle 51 in such manner that the normally closed contact LS1A will open and simultaneously the normally open contact LS1B will close for approximately 2¾ revolutions of the spindle 51. The opening of contact LS1A causes the relay HR3 to close contacts HR3A and HR3B shown in FIG. 7 and thereby reset the peak to peak memory 63. After one revolution of the spindle 51, the switch LS2 returns to its normal closed position. Assuming that the relay contact HR1A is in its closed position as controlled by relay HR1 shown in FIG. 7, current will flow through the line 74 and operate relay HR2 to close normally open relay contacts HR2A and HR2B. It should be mentioned at this point that the relay HR1 is continually pulsating in response to the rotation of the tire. The purpose of the relay HR1 is to assure that once the force measurements taken around the circumference of the tire are passed through the control circuitry shown in FIG. 7 and the desired location to be marked by the brander 1 is determined, the relay HR1 operating in conjunction with the time delay portion of the comparator driver 67 will delay marking of the tire until the desired position to be marked is in proper alignment with the brander 1. The relay HR2 insures that the marking of the tire will occur only after a complete positive cycle of rotation of the tire to insure that the signals produced by the control circuitry will reflect a true measurement of the force level on which the marking is to be based. If the contact HR1A is open at the time the switch LS2 closes, the relay HR2 will not operate until the tire reaches a position in its rotation that a complete positive cycle will be measured. If contact HR1A is closed and the relay HR2 closes contacts HR2A and HR2B, then as soon as the relay HR1, which is continuously pulsating, closes the contact HR1B then the current will flow through the normally closed contact HR4A to the timer T1 which times the dipping of the branding iron 15 in the wax container 16 as shown in FIG. 5. The relay HR4 is operated by signals from the harmonic overload indicator and control 70 as shown as a block in FIG. 7. The harmonic overload indicator and control 70 determines when a force reading taken on a tire is above an acceptable limit and will actuate the relay HR4 to open the contact HR4A and prevent further operation of the relay circuitry which operates the brander 1. The indicator and control 70 therefore prevents marking of tires containing unacceptable force levels. Assuming, however, that the tire being measured is within the acceptable force levels and the relay HR4 does not operate to open the contact HR4A the timer T1 will close the switch T1A and permit current to flow through the closed switch T1B to operate the solenoid 44A which in turn operates the valve 44 shown in FIGS. 4 through 6. Current flowing through the switch T1B will also operate the spindle brake 75 which stops rotation of the spindle 51 with the tire 48. After a predetermined period of time, timer T1 operates the switch T1B to remove the current from the solenoid 44A and the spindle brake 75 and redirect the flow of current through the line 76 to the timer T2 and through the switch T2A to a solenoid 46A which operates a valve 46 to extend the brander 1 against the surface of the tire as shown in FIG. 6 to mark the tire 48. After a brief time interval, the switch 2A moves to a position which permits the current to flow through a line 77 to the driving portion of the force variation machine to resume rotation of the tire in preparation for removing the tire from the machine. A normally closed relay contact 78 opens during the removal of the marked tire to permit the relay circuitry and the control circuitry to reset for marking a subsequent tire. So long as the relay contact 78 remains closed, the cicuitry of the system will not reset for a new marking. This prevents double marking of any one tire.

Various changes can be made in the illustrative embodiments shown herein without departing from the scope of the invention.

What is claimed is:

1. A tire marking apparatus for use with a tire force variation measurement machine of the type wherein a tire is mounted on a spindle and rotated by a power means while force variation measurements are taken around the circumference of the tire, said force variation measurement machine generating an electrical output signal representative of the force variation measurements, said marking apparatus comprising:
   (A) electrical control circuitry having an input connected to an output of the force variation machine for selecting certain portions of the signals generated by the force variation machine and converting them to usable electrical control signals which pass to the output of the control circuitry;
   (B) a mechanical marking device mounted adjacent the tire to be marked said marking device comprising:
      (1) a fixed base,
      (2) a carriage, mounted on the base movable to to and from the tire,
      (3) a marking tip supported on the carriage for contacting and marking the tire upon sufficient movement of the carriage in the direction of the tire, and
      (4) actuator means connected to the output of the control circuitry for moving the carriage to and from the tire,
      (5) said actuator means being operated by the output signals from the electrical control circuit when such signals reach a certain predetermined magnitude to move the carriage and marking tip toward the tire until the tip contacts and marks the tire; and
   (C) means stopping rotation of the tire while the marking tip is in contact with the tire.

2. A tire marking apparatus as claimed in claim 1 wherein the marking tip is heated.

3. A tire marking apparatus as claimed in claim 1 wherein the actuator means is a pneumatic cylinder.

4. A tire marking apparatus as claimed in claim 1 wherein the marking tip is rotatably mounted on the movable carriage by a shaft having a gear fixed thereon and wherein a rack driven by the actuator means rotates the gear to dip the marking tip into a marking substance.

5. A tire marking apparatus as claimed in claim 1 wherein the electrical control circuitry comprises:
   (A) an amplifier and demodulator for receiving signals from the force variation machine;
   (B) filter means for selecting certain portions of the signals received by the amplifier and demodulator;
   (C) a non-inverting amplifier connected to an output of the filter means;
   (D) a memory circuit for storing signals from the non-inverting amplifier;
   (E) a comparator and relay driver for comparing signals from the force variation machine with signals stored in the memory circuit; and
   (F) a power supply for providing operating voltages to the various circuits of the control circuitry.

6. A tire marking apparatus as claimed in claim 5 including a time delay means activated by the rotational position of the spindle of the force variation machine to prevent the output signal from the control circuitry from operating the actuator means during the time the tire rotates from the position where a mark signal is taken to the position where the spot to be marked is adjacent the marking tip.

7. A tire marking apparatus as claimed in claim 1 including means to prevent marking of a tire which gives force variation reading beyond certain predetermined limits.

8. A tire marking apparatus as claimed in claim 1 including means to prevent the marking device from imparting more than one mark to any one tire.

9. A tire marking apparatus for imprinting a given location on a tire to indicate a relative physical characteristic of the tire at that location comprising:
   (A) means rotating a tire about its axis;
   (B) means measuring the variations of a given physical characteristic of the tire around the circumference thereof;
   (C) means converting the measurements into electrical control signals;
   (D) a branding machine mounted adjacent the tire being measured said branding machine comprising:
      (1) a fixed base, and
      (2) a brander mounted on the base and movable to and from the tire in response to control signals from the converting means;
      (3) said brander having a heated tip which imparts a mark on the tire at a location having a certain predetermined variation in the measured physical characteristic from other locations around the circumference of the tire when the tip is moved into contact with the tire; and
   (E) means stopping rotation of the tire while the branding tip is in contact therewith.

10. A tire marking apparatus as claimed in claim 9 including means to prevent the brander from marking a tire which has a physical characteristic beyond a certain range.

11. A tire marking apparatus as claimed in claim 9 including means to prevent the brander from imparting more than one mark to any one tire.

References Cited

UNITED STATES PATENTS 3,412,615    9/1968    Buser et al. _____ 73—146

DONALD O. WOODIEL, Primary Examiner